United States Patent
Shiromoto et al.

(10) Patent No.: US 6,288,168 B1
(45) Date of Patent: Sep. 11, 2001

(54) PROPYLENE BASED RESIN COMPOSITION

(75) Inventors: Seiji Shiromoto, Ichihara; Haruyuki Suzuki, Sodegaura; Tatsuhiro Nagamatsu, Ichihara, all of (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/471,176

(22) Filed: Dec. 23, 1999

(30) Foreign Application Priority Data

Dec. 25, 1998 (JP) .................................................. 10-370830

(51) Int. Cl.$^7$ ...................................................... C08L 53/00
(52) U.S. Cl. .................................................................. 525/88
(58) Field of Search .................................................. 525/88

(56) References Cited

FOREIGN PATENT DOCUMENTS

| | | |
|---|---|---|
| 5-88264 | 12/1993 | (JP) . |
| 8-283476 | 10/1996 | (JP) . |
| 9-31264 | 2/1997 | (JP) . |
| 10-279744 | 10/1998 | (JP) . |

*Primary Examiner*—Terressa M. Boykin
(74) *Attorney, Agent, or Firm*—Birch, Stewart, Kolasch & Birch, LLP

(57) ABSTRACT

There is provided a propylene based resin composition comprising:

(i) about 70 to 90% by weight of a propylene block copolymer; and
(ii) about 30 to 10% by weight of an ethylene based resin, wherein:
   (a) the relation between its die swelling ratio ($SR_1$) at a shear rate of 6.08 sec$^{-1}$ and its die swelling ratio ($SR_2$) at a shear rate of 608 sec$^{-1}$ satisfies the following formula (1); and
   (b) the relation among its Izod impact value (kJ/m$^2$) at a temperature of 0° C., its flexural modulus (MPa) at a temperature of 23° C. and its haze value (%) satisfies the following formula (2)

$SR_2/SR_1 \leq$ about 1.10      (1)

Izod impact value×Flexural modulus/Haze value $\geq$ about 200    (2).

10 Claims, No Drawings

PROPYLENE BASED RESIN COMPOSITION

FIELD OF THE INVENTION

The present invention relates to a propylene based resin composition. More specifically, the present invention relates to a propylene based resin composition having (i) a superior balance among its low temperature impact resistance, flexural modulus (rigidity) and transparency, and (ii) a superior moldability. The propylene based resin composition of the present invention is especially suitable for producing a container according to a blow molding method, the container obtained according to said method being hereinafter referred to as "blow-molded container".

BACKGROUND OF THE INVENTION

A propylene resin is one of the resins that have been widely used to produce containers for goods such as detergents, shampoos, drinks, foods and medicines. Almost all of the containers are obtained according to a blow molding method, which method is well known in the art as a production method for thermoplastic resin made containers. The blow molding method can be classified into (i) a direct blow molding method using a hot parison, and (ii) an injection-stretching blow molding method using a hot parison or a cold parison. The former molding method is superior in its molding stability and its cost of molding equipment when compared to the latter molding method. Therefore, many of polypropylene resin made containers are obtained according to the former molding method.

A polypropylene resin has a defect of poor impact resistance in spite of its superior heat resistance, rigidity and transparency. Therefore, there have heretofore been proposed some compositions which are improved in their impact resistance without detrimental effect on superior transparency of the polypropylene resin. As such compositions, there are known a composition comprising a polypropylene resin, a straight chain low-density polyethylene and an ethylene-α-olefin copolymer elastomer (JP-B 5-88264); an ethylene based copolymer composition comprising an ethylene-α-olefin copolymer polymerized using a metallocene catalyst and a crystalline polyolefin (JP-A 8-283476); and a composition comprising a polypropylene resin and an ethylene-α-olefin copolymer polymerized using a metallocene catalyst (JP-A 9-31264). Each of the references referred to above is incorporated herein by reference in its entirety.

However, blow-molded containers obtained using any of the compositions mentioned above have a problem such that the impact resistance thereof in terms of a falling strength is far from a satisfactory level.

Moreover, the aforementioned compositions per se have a problem such that they are not satisfactory in their moldability. That is, a die swelling ratio is greatly changed under conditions where a shear rate is greatly changed, for example, (i) when blow molding conditions such as extruder output are altered, or (ii) when a die gap is altered in order to prevent an uneven thickness caused by draw down of the resin, or (iii) when a die gap is altered in order to prevent an uneven thickness caused by a shape of the molded product, and as a result, a thickness variation of a parison is increased.

SUMMARY OF THE INVENTION

Accordingly, an object of the present invention is to provide a propylene based resin composition having both (i) a superior balance among its low temperature impact resistance, rigidity and transparency, and (ii) a superior moldability.

Another object of the present invention is to provide a blow-molded container obtained from the resin composition mentioned above.

A further object of the present invention is to provide a blow-molded multilayer container obtained from the resin composition mentioned above.

The present inventors have undertaken extensive studies to develop a propylene based resin composition having both (i) a superior balance among its low temperature impact resistance, rigidity and transparency, and (ii) a superior moldability. As a result, it has been found that the objects of the present invention can be accomplished by providing a propylene based resin composition, wherein (i) its die swelling ratios satisfy a specific relational expression, and (ii) its Izod impact value, its flexural modulus and its haze value satisfy another specific relational expression. And thereby the present invention has been obtained.

The present invention provides a propylene based resin composition comprising:

(i) about 70 to 90% by weight of a propylene block copolymer; and (ii) about 30 to 10% by weight of an ethylene based resin, wherein:

(a) the relation between its die swelling ratio ($SR_1$) at a shear rate of 6.08 $sec^{-1}$ and its die swelling ratio ($SR_2$) at a shear rate of 608 $sec^{-1}$ satisfies the following formula (1); and (b) the relation among its Izod impact value ($kJ/m^2$) at a temperature of 0° C., its flexural modulus (MPa) at a temperature of 23° C. and its haze value (%) satisfies the following formula (2)

$$SR_2/SR_1 \leq about\ 1.10 \qquad (1)$$

Izod impact value×Flexural modulus/Haze value≧about 200   (2).

The present invention also provides a blow-molded container, which comprises the propylene based resin composition mentioned above.

The present invention further provides a blow-molded multilayer container, which comprises the propylene based resin composition mentioned above.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

The propylene based resin composition of the present invention comprises (i) a major amount of a propylene block copolymer, and (ii) a minor amount of an ethylene based resin. More specifically, the present resin composition comprises (i) a propylene block copolymer in an amount of from about 70 to 90% by weight, preferably from about 72 to 89% by weight, and more preferably from about 75 to 88% by weight, and (ii) an ethylene based resin in an amount of from about 30 to 10% by weight, preferably from about 28 to 11% by weight, and more preferably from about 25 to 12% by weight, provided that the sum of both components is 100% by weight.

The above-mentioned term "propylene block copolymer" means a copolymer obtainable by a process, which comprises the steps of:

(1) First step: polymerizing propylene alone or a mixture of propylene and ethylene until a content of a polymer component (component A), which has a content of a repeating unit derived from ethylene of from about 0 to 2% by weight, reaches from about 70 to 90% by weight based on the total weight of the component A and a below-defined component B; and (2) Second step: copolymerizing propylene with ethylene in the presence of the component A produced in First step until a content of a component B, which is a propylene-ethylene copolymer having a content of a repeating unit derived from ethylene of from about 15 to 50% by weight, reaches from about 10 to 30% by weight based on the total weight of the components A and B.

A content of the component A in said propylene block copolymer is preferably from about 75 to 89% by weight, and more preferably from about 80 to 88% by weight, and a content of the repeating unit derived from ethylene in the component A is preferably not more than about 1% by weight. Meanwhile, a content of the component B in said propylene block copolymer is preferably from about 25 to 11% by weight, and more preferably from about 20 to 12% by weight, and a content of the repeating unit derived from ethylene in the component B is preferably from about 20 to 45% by weight, and more preferably from about 25 to 40% by weight. Among the propylene block copolymers mentioned above, those having a melt flow rate (MFR) at 230° C. of not more than about 2 g/10 min., preferably from about 0.5 to 1.8 g/10 min., and more preferably from about 0.8 to 1.6 g/10 min. are preferred.

The above-mentioned term "ethylene based resin" means a thermoplastic polymer, which has a content of a repeating unit derived from ethylene of not less than about 50% by weight. Said thermoplastic polymer contains, for example, a homopolymer of ethylene, a copolymer of ethylene with an α olefin having 3 to 18 carbon atoms and a copolymer of ethylene with at least one third monomer. Examples of the α-olefin are propylene, butene-1,4-methylpentene-1, hexene-1, octene-1 and decene-1. Examples of said third monomer are conjugated dienes such as butadiene and isoprene, non-conjugated dienes such as 1,4-pentadiene, acrylic acid, acrylic acid esters such as methyl acrylate and ethyl acrylate, methacrylic acid, methacrylic acid esters such as methyl methacrylate and ethyl methacrylate, and vinyl acetate.

Examples of the ethylene based resin are a low-density polyethylene; an ultra low-density polyethylene; a medium-density polyethylene; a high-density polyethylene; a copolymer of ethylene with an α olefin having 3 to 18 carbon atoms, such as an ethylene-propylene copolymer, an ethylene-butene-1 copolymer, an ethylene-4-methylpentene-1 copolymer, an ethylene-hexene-1 copolymer, an ethylene-octene-1 copolymer and an ethylene-decene-1 copolymer; a copolymer of ethylene with a conjugated diene such as butadiene and isoprene; a copolymer of ethylene with a non-conjugated diene such as 1,4-pentadiene; a copolymer of ethylene with acrylic acid, methacrylic acid or vinyl acetate; and a resin obtained by modifying, for example, graft-modifying, the resin as mentioned above with, for example, an α, β-unsaturated carboxylic acid or its derivative such as acrylic acid and methyl acrylate or an alicyclic carboxylic acid or its derivative such as maleic anhydride.

Of these, preferred are, for example, the following resins (1) to (3) and their combinations:

(1) an ethylene-α-olefin copolymer (E1) obtained by polymerizing ethylene and α-olefin in the presence of a metallocene catalyst;

(2) an ultra low-density polyethylene (E2); and (3) a resin blend of the ethylene-α-olefin copolymer (E1) mentioned in item (1) with at least one ethylene based resin selected from the group consisting of the ultra low-density polyethylene (E2), low-density polyethylene (E3) and ethylene-α-olefin copolymers (E4) other than the aforementioned ethylene-α-olefin copolymer (E1).

The above-mentioned term "ethylene-α-olefin copolymer (E1)" means a copolymer of ethylene with an α-olefin having 3 to 18 carbon atoms, which has a density of from about 0.910 to 0.930 g/cm$^3$. A preferred upper limit of the density is 0.929 g/cm$^3$, and a more preferred is 0.928g/cm$^3$. Examples of the α-olefin are propylene, butene-1, pentene-1, hexene-1,4-methylpentene-1, octene-1, decene-1, dodecene-1, tetradecene-1, hexadecene-1 and octadecene-1. A melt flow rate (MFR) at 190° C. of the ethylene-α-olefin copolymer (E1) is preferably from about 0.05 to 50 g/10 min., more preferably from about 0.1 to 40 g/10 min., and most preferably from 1 to 30 g/10 min.

Said ethylene-α-olefin copolymer (E1) can preferably be produced, for example, by copolymerizing in a gas phase ethylene with the α-olefin in the presence of a polymerization catalyst (metallocene catalyst), which comprises a transition metal compound having a cyclopentadiene type anion skeleton-carrying group (JP-A 3-234717). The reference referred to above is incorporated herein by reference in its entirety.

The above-mentioned term "ultra low-density polyethylene (E2)" means a copolymer of ethylene with an α-olefin having 3 to 18 carbon atoms, which has a density of from about 0.880 g/cm$^3$ to 0.910 (exclusive) g/cm$^3$. The density is preferably from about 0.882 to 0.909 g/cm$^3$, and more preferably from about 0.885 to 0.908 g/cm$^3$. Examples of the α-olefin are the same as those enumerated for the foregoing ethylene-α-olefin copolymer (E1). An MFR at 190° C. of the ultra low-density polyethylene (E2) is preferably from about 0.05 to 50 g/10 min., more preferably from about 0.1 to 40 g/10 min., and most preferably from about 1 to 30 g/10 min.

The above-mentioned term "low-density polyethylene (E3)" means a polyethylene having a density of about 0.915 to 0.930 g/cm$^3$. The density is preferably from about 0.916 to 0.929 g/cm$^3$, and more preferably from about 0.918 to 0.928 g/cm$^3$. The low-density polyethylene (E3) can be obtained by polymerizing ethylene according to a high pressure radical polymerization process. An MFR at 190° C. of the low density polyethylene (E3) is preferably from about 0.05 to 50 g/10 min., more preferably from about 0.1 to 40 g/10 min., and most preferably from about 1 to 30 g/10 min.

The above-mentioned term "ethylene-α-olefin copolymer (E4)" means a copolymer of ethylene with an α-olefin having 3 to 18 carbon atoms, which has a density of about 0.910 to 0.930 g/cm$^3$, provided that the foregoing ethylene-α-olefin copolymer (E1) is excluded. The density is preferably from about 0.912 to 0.929 g/cm$^3$, and more preferably from about 0.915 to 0.928 g/cm³. Examples of the α-olefin are the same as those enumerated for the foregoing ethylene-α-olefin copolymer (E1). An MFR at 190° C. of the ethylene-α-olefin copolymer (E4) is preferably from about 0.05 to 50 g/10 min., more preferably from about 0.1 to 40 g/10 min., and most preferably from about 1 to 30 g/10 min. A production process for the ethylene-α-olefin copolymer (E4) is not particularly limited, provided that the production process for the ethylene-α-olefin copolymer (E1), which comprises polymerizing ethylene with the α-olefin in the presence of the metallocene catalyst, is excluded. The ethylene-α-olefin copolymer (E4) can be obtained, for example, by polymerizing ethylene with the α-olefin in the presence of a Ziegler-Natta catalyst (JP-A 7-316220). The reference referred to above is incorporated herein by reference in its entirety.

A value of the left part in the formula (1), i.e. $SR_2/SR_1$, is preferably not more than about 1.09, and more preferably not more than about 1.08. When the left part value exceeds 1.10, a desired moldability may not be obtained. That is, under conditions where a shear rate is greatly changed, for example, (i) when blow molding conditions such as extruder output are altered, (ii) when a die gap is altered in order to prevent an uneven thickness caused by draw down of the resin, or (iii) when a die gap is altered in order to prevent an uneven thickness caused by a shape of the molded product, a die swelling ratio may be greatly changed, and as a result, thickness variation of parison obtained may be increased. How to measure the die swelling ratio is as described hereinafter.

A value of the left part in the formula (2), i.e. "Izod impact value×Flexural modulus/Haze value", is not less than about 200, preferably not less than about 250, and most preferably not less than about 300. When the left part value is less than about 200, it is not easy to obtain the desired propylene based resin composition, which has a superior balance among its low temperature impact resistance, rigidity and transparency. How to measure the Izod impact value, flexural modulus and haze value is as described hereinafter.

From a viewpoint of (i) further improving the transparency of the propylene based resin composition of the present invention, and (ii) reducing a molding cycle time for producing molded products from the present resin composition, the propylene block copolymer or the ethylene based resin used in the present invention may be used in combination with a crystalline nucleating agent. An amount of the crystalline nucleating agent used is generally from about 0.1 to 0.5 parts by weight based on 100 parts by weight of the present resin composition. When the amount exceeds about 0.5 parts by weight, above-mentioned effects (i) and (ii) befitting thereto may not be obtained, thereby resulting in extra cost.

Examples of the nucleating agent are sorbitol type nucleating agents, organic phosphate type nucleating agents, metal aromatic carboxylate nucleating agents such as aluminum p-t-butyl aromatic carboxylate (such as aluminum p-t-butyl benzoate, abbreviated as PTBBA-Al), polymer nucleating agents such as polyvinyl cycloalkanes, and inorganic compounds such as talc. These nucleating agents may be used each alone or in combination of two or more thereof.

In addition, the propylene block copolymer or the ethylene based resin used in the present invention may be used in combination with inorganic fillers such as talc, calcium carbonate and mica; additives such as neutralizing agents, anti-oxidants, heat stabilizers, lubricants, ultraviolet ray absorbers and antistatic agents; and coloring agents such as dyes and pigments, as far as the objects and the effects of the present invention are not impaired.

A production process for the resin composition of the present invention is not particularly limited. For example, the present resin composition can be produced by melt-kneading respective components with a kneader known in the art. Said kneader contains, for example, a single screw kneading extruder, a multi screw kneading extruder and a Banbury mixer. Melt kneading conditions are not particularly limited as far as no deterioration of the resin composition occurs due to shear of melt kneading, heat supplied for melt kneading and heat increased by the shear of melt kneading. From a viewpoint of preventing the resin composition from deteriorating, it is effective to control a kneading temperature properly, or to add any anti-oxidant or heat stabilizer.

The resin composition of the present invention can be molded into various molded parts by various molding methods known in the art, such as, for example, an injection molding method, a compression molding method, an injection compression molding method, a T-die film forming method, an oriented film forming method, a blown film forming method, a sheet forming method, a calender molding method, an air pressure molding method, a vacuum molding method, a pipe forming method, a profile extrusion molding method, an blow molding method, an injection blow molding method, an injection stretch blow molding method and a lamination molding method. As noted previously, however, the propylene based resin composition of the present invention is especially suitable for producing a container according to a blow molding method.

The resin composition of the present invention can be molded with a blow molding machine known in the art to obtain a desired blow-molded container. For example, the blow-molded container can be produced by a process comprising the steps:

(i) extruding the resin composition with an extruder to obtain a melt parison;

(ii) setting said melt parison in a mold having a desired container shape, which mold is provided to a blow molding machine;

(iii) blowing a compressed gas into the mold to expand the parison toward an inner wall of the mold; and (iv) cooling the resulting product to obtain the blow-molded container.

Further, the resin composition can be molded with a blow molding machine known in the art to obtain a blow-molded container, which has a surface decorated with a silk screen print, an offset print, a shrink label, a stretch label or an in-mold label. For example, a blow-molded container having a surface decorated with an in-mold label can be produced by a process comprising the steps:

(i) placing a label in a mold having a desired container shape by a means such as air-suction;

(ii) setting a melt parison in the mold, which parison is obtained by extruding the resin composition with an extruder;

(iii) blowing a compressed gas into the mold to expand the parison toward an inner wall of the mold; and (iv) cooling the resulting product to obtain the blow-molded container.

Such blow-molded container having a surface decorated with an in-mold label is a particularly preferred container having a superior appearance, because of no difference in level between the label surface and the container surface.

Furthermore, using the resin composition of the present invention, a blow-molded multilayer container having two or more layers can also be obtained. Such blow-molded multilayer container contains, for example, (i) a blow-molded two-layer container having a frosted glass like appearance, which container has an outer layer comprising a resin composition prepared by blending an ethylene-propylene random copolymer with a high-density polyethylene produced by a low pressure method, and an inner layer comprising the resin composition of the present invention, and (ii) a blow-molded three-layer container having a superior gas barrier property, which container has outer and inner layers comprising the resin composition of the present invention and an intermediate layer comprising an ethylene-vinyl alcohol copolymer.

The above-mentioned blow-molded multilayer container may have a layer comprising a recycled resin, which resin is obtained by pulverizing burrs by-produced during the blow molding process. Such recycled resin may be used in combination with other resins.

Blow-molded containers obtained from the resin composition of the present invention can be widely used for liquid daily necessaries such as shampoos, hairdressing agents, cosmetics, detergents and disinfectants; for liquid foods such as soft drinks, water and seasonings; for various chemicals; and for industrial liquids.

EXAMPLE

The present invention is illustrated in more detail with reference to the following Examples, which are only illustrative, and are not limitative for the scope of the present invention.

The evaluation methods used in the following Examples Comparative Examples are as follows.

1. Melt Flow Rate (MFR)

With respect to the propylene block copolymer and the propylene based resin composition, it was measured at 230° C. according to JIS K7210, Condition Number 14. With respect the ethylene based resin, it was measured at 190° C. according to JIS K6760.

2. Density

Measured according to JIS K6760.

3. Die Swelling Ratio ($SR_1$ and $SR_2$)

Measured at 230° C. according to JIS K7199 using CAPIROGRAPH-1B (a trade mark of a capillary rheometer manufactured by Toyoseiki Sesakusho Co., Ltd.), which has a capillary of 1 mm diameter and 40 mm length.

4. Izod Impact Value ($kJ/m^2$)

Measured according to JIS K7110 using a test specimen, which has been kept at 0° C. in a thermostat for more than 24 hours.

5. Flexural Modulus (Rigidity: MPa)

Measured according to JIS K7106.

6. Haze Value (%)

Measured according to JIS K7105 using a resin sheet with a 1 mm thickness prepared by the following process:

(1) putting the resin between metal plates, and pre-heating said resin for 5 minutes at 230° C. under a pressure of not higher than 5 kg-f/$cm^2$ with a hot press;

(2) pressing rapidly the pre-heated resin obtained above (1) together with the metal plates for 5 minutes at 230° C. under a pressure of 50 kg-f/$cm^2$ with the hot press; and (3) pressing rapidly the resin obtained above (2) together with the metal plates for 5 minutes at 30° C. under a pressure of 20 kg-f/$cm^2$ with another chill press, thereby obtaining the resin sheet with a 1 mm thickness.

The polymers used in Examples and Comparative Examples are as follows.

1. Propylene Block Copolymer

Propylene block copolymer (a)

NOBLEN, a trade mark f or a copolymer produced by Sumitomo Chemical Co., Ltd. Said copolymer comprises the above-defined components A and B, and has (1) a content of a repeating unit derived from ethylene in the component A of 0% by weight, (2) a content of a repeating unit derived from ethylene in the component B of 38% by weight, (3) a proportion of the component B in the copolymer of 15.5% by weight, and (4) an MFR of 1.3 g/10 min.

2. Ethylene Based Resin

Ethylene based resin (a)

SUMIKATHENE E FV404, a trade mark for an ethylene-hexene-1 copolymer produced by Sumitomo Chemical Co., Ltd. Said copolymer is produced by copolymerizing ethylene with hexene-1 in the presence of a metallocene catalyst, and has a density of 0.927 g/$cm^3$, and an MFR of 4.0 g/10 min.

Ethylene based resin (b)

EXCELLEN VL VL400, a trade mark for an ethylene-buten-1 copolymer (ultra low-density polyethylene) produced by Sumitomo Chemical Co., Ltd., which has a density of 0.900 g/$cm^{33}$, and an MFR of 5.0 g/10 min.

Ethylene based resin (c)

SUMIKATHENE L405, a trade mark for a low-density polyethylene produced by Sumitomo Chemical Co., Ltd. according to a high pressure process, which has a density of 0.923 g/$cm^3$, and an MFR of 3.7 g/10 min.

Ethylene based resin (d)

SUMIKATHENE α GZ802, a trade mark for an ethylene-hexene-1 copolymer produced by Sumitomo Chemical Co., Ltd., which has a density of 0.927 g/$cm^3$, and an MFR of 30 g/10 min.

Ethylene based resin (e)

SUMIKATHENE G801, a trade mark for a low-density polyethylene produced by Sumitomo Chemical Co., Ltd. according to a high pressure process, which has a density of 0.918 g/$cm^3$, and an MFR of 20 g/10 min.

3. Third Polymer

Propylene-ethylene random copolymer (a) NOBLEN S131, a trade mark for a copolymer produced by Sumitomo Chemical Co., LTD., which has a content of a repeating unit derived from ethylene of 5% by weight, and an MFR of 1.3 g/10 min.

Propylene homopolymer (a)

NOBLEN YE101, a trade mark for a polymer produced by Sumitomo Chemical Co., Ltd., which has an MFR of 1.0 g/10 min.

EXAMPLE 1

83 Parts by weight of the propylene block copolymer (a) and 17 parts by weight of the ethylene based resin (a) were melt-kneaded at 250° C. and at a screw revolution speed of 100 rpm with a single screw extruder having a screw diameter of 65 mm (see Table 1, wherein the blending proportion is by weight), thereby obtaining a propylene based resin composition. The obtained propylene based resin composition was found to have an MFR=1.6 g/10 min., $SR_1$=1.59, $SR_2$=1.60 and $SR_2/SR_1$=1.60/1.59=1.01 (see Table 3).

Said propylene based resin composition was also found to have an Izod impact value of 54 kJ/$m^2$, a flexural modulus of 850 MPa, and a haze value of 87%, and therefore Izod impact value×Flexural modulus/Haze value=54×850/87= 527 (see Table 4).

Said propylene based resin composition was extruded at a die temperature of 230° C. and at an extruder output of 20 kg/h with a blow molding machine, NB3B Type, manufactured by The Japan Steel Works, Ltd., and having a screw diameter of 50 mm., thereby obtaining a hot parison. The hot parison was put between molds kept at 20° C., and then air having a pressure of 6 kg-f/cm² was blown thereinto for 12 seconds to obtain an elliptical narrow necked blow-molded container. Said container had a weight of 30 g, a side wall thickness of about 0.7 mm and a volume of 500 ml. The moldability of the propylene based resin composition into the blow-molded container was excellent, and the obtained container had a superior balance among its transparency, rigidity and falling strength (impact resistance).

EXAMPLES 2 to 5

The propylene block copolymer (a) and one or two ethylene based resins selected from the ethylene based resins (a) to (d) were melt-kneaded in each blending proportion as shown in Table 1 in a manner similar to that of Example 1, thereby obtaining respective propylene based resin compositions. Physical properties thereof measured in a manner similar to that of Example 1 are as shown in Tables 3 and 4. In each of Examples 2 to 5, the moldability of each of the obtained propylene based resin compositions into the blow-molded container was excellent, and the obtained container had a superior balance among its transparency, rigidity and falling strength (impact resistance).

Comparative Example 1

Only the propylene block copolymer (a) was melt-kneaded to obtain a kneaded product in a manner similar to that of Example 1 (see Table 2, wherein the blending proportion is by weight). Results obtained by evaluating the resulting kneaded product in a manner similar to that of Example 1 are as shown in Tables 3 and 4. The kneaded product was molded to obtain a blow-molded container in a manner similar to that of Example 1. The moldability thereof was not excellent, and the blow-molded container was found to be inferior in its transparency and impact resistance.

Comparative Example 2

Only the propylene-ethylene random copolymer (a) was melt-kneaded to obtain a kneaded product in a manner similar to that of Example 1. Results obtained by evaluating the resulting kneaded product in a manner similar to that of Example 1 were as shown in Tables 3 and 4. The kneaded product was molded to obtain a blow-molded container in a manner similar to that of Example 1. The moldability thereof was not excellent, and the blow-molded container was found to be inferior in its rigidity and impact resistance.

Comparative Example 3

The propylene-ethylene random copolymer (a), the ethylene based resin (b) and the ethylene based resin (c) were melt-kneaded in a blending proportion as shown in Table 2 in a manner similar to that of Example 1, thereby obtaining a resin composition. Results obtained by evaluating the resin composition in a manner similar to that of Example 1 were as shown in Tables 3 and 4. The resin composition was molded to obtain a blow-molded container in a manner similar to that of Example 1. The moldability thereof was not excellent and the resulting container was found to be inferior in its rigidity and impact resistance.

Comparative Example 4

The propylene homopolymer (a), the ethylene based resin (b) and the ethylene based resin (c) were melt-kneaded in a blending proportion as shown in Table 2 in a manner similar to that of Example 1, thereby obtaining a resin composition. Results obtained by evaluating the resin composition in a manner similar to that of Example 1 were as shown in Tables 3 and 4. The resin composition was molded to obtain a blow-molded container in a manner similar to that of Example 1. The moldability thereof was not excellent and the resulting container was found to be inferior in its impact resistance.

Comparative Example 5 to 8

The propylene block copolymer (a) and one or two ethylene based resin selected from the ethylene based resins (b) to (e) were melt-kneaded in a blending proportion as shown in Table 2 in a manner similar to that of Example 1, thereby obtaining respective resin compositions. Results obtained by evaluating the resin compositions in a manner similar to that of Example 1 were as shown in Tables 3 and 4. Each resin composition was molded to obtain a blow-molded container in a manner similar to that of Example 1. In any case, the moldability thereof was not excellent and the resulting container was found to be inferior in any of its transparency, rigidity or impact resistance.

TABLE 1

| Example No. | 1 | 2 | 3 | 4 | 5 |
|---|---|---|---|---|---|
| Propylene block copolymer (a) | 83 | 83 | 83 | 83 | 83 |
| Ethylene based resin | | | | | |
| Ethylene based resin (a) | 17 | — | 4 | 4 | 13 |
| Ethylene based resin (b) | — | 17 | — | — | 4 |
| Ethylene based resin (c) | — | — | 13 | — | — |
| Ethylene based resin (d) | — | — | — | 13 | — |

TABLE 2

| Comparative Example No. | 1 | 2 | 3 | 4 | 5 | 6 | 7 | 8 |
|---|---|---|---|---|---|---|---|---|
| Propylene block copolymer (a) | 100 | — | — | — | 60 | 96 | 83 | 83 |
| Ethylene based resin | | | | | | | | |
| Ethylene based resin (b) | — | — | 4 | 4 | 10 | 1 | — | — |
| Ethylene based resin (c) | — | — | 13 | 13 | 30 | 3 | — | — |
| Ethylene based resin (d) | — | — | — | — | — | — | 17 | — |
| Ethylene based resin (e) | — | — | — | — | — | — | — | 17 |
| Third polymer | | | | | | | | |
| Propylene-ethylene random copolymer (a) | — | 100 | 83 | — | — | — | — | — |
| Propylene homopolymer (a) | — | — | — | 83 | — | — | — | — |

TABLE 3

| | MFR (g/10 min.) | SR$_1$ | SR$_2$ | SR$_2$/SR$_1$ |
|---|---|---|---|---|
| Example 1 | 1.6 | 1.59 | 1.60 | 1.01 |
| Example 2 | 1.8 | 1.70 | 1.62 | 0.95 |
| Example 3 | 1.4 | 1.58 | 1.57 | 0.99 |
| Example 4 | 1.9 | 1.66 | 1.68 | 1.01 |
| Example 5 | 1.5 | 1.57 | 1.57 | 1.00 |
| Comparative Example 1 | 1.3 | 1.33 | 1.50 | 1.13 |

TABLE 3-continued

| | MFR (g/10 min.) | $SR_1$ | $SR_2$ | $SR_2/SR_1$ |
|---|---|---|---|---|
| Comparative Example 2 | 1.3 | 1.32 | 1.58 | 1.20 |
| Comparative Example 3 | 1.6 | 1.57 | 1.60 | 1.02 |
| Comparative Example 4 | 1.3 | 1.53 | 1.66 | 1.08 |
| Comparative Example 5 | 2.2 | 1.60 | 1.70 | 1.06 |
| Comparative Example 6 | 1.5 | 1.28 | 1.48 | 1.16 |
| Comparative Example 7 | 2.4 | 1.64 | 1.73 | 1.05 |
| Comparative Example 8 | 2.0 | 1.63 | 1.68 | 1.03 |

TABLE 4

| | Izod impact value (kJ/m$^2$) | Modulus of elasticity in bending (Mpa) | Haze value (%) | Izod impact value × Flexural Modulus/ Haze value |
|---|---|---|---|---|
| Example 1 | 54 | 850 | 87 | 527 |
| Example 2 | 73 | 770 | 89 | 628 |
| Example 3 | 41 | 850 | 87 | 402 |
| Example 4 | 47 | 840 | 88 | 449 |
| Example 5 | 54 | 820 | 84 | 527 |
| Comparative Example 1 | 7 | 1000 | 97 | 71 |
| Comparative Example 2 | 2 | 680 | 51 | 26 |
| Comparative Example 3 | 6 | 590 | 91 | 38 |
| Comparative Example 4 | 2 | 1110 | 68 | 32 |
| Comparative Example 5 | 25 | 480 | 91 | 134 |
| Comparative Example 6 | 9 | 990 | 95 | 92 |
| Comparative Example 7 | 19 | 790 | 91 | 162 |
| Comparative Example 8 | 13 | 720 | 79 | 116 |

What is claimed is:

1. A propylene based resin composition comprising:
   (i) about 70 to 90% by weight of a propylene block copolymer; and
   (ii) about 30 to 10% by weight of an ethylene based resin, wherein:
      (a) the relation between its die swelling ratio ($SR_1$) at a shear rate of 6.08 sec$^{-1}$ and its die swelling ratio ($SR_2$) at a shear rate of 608 sec$^{-1}$ satisfies the following formula (1); and
      (b) the relation among its Izod impact value (kJ/m$^2$) at a temperature of 0° C., its flexural modulus (MPa) at a temperature of 23° C. and its haze value (%) satisfies the following formula (2)

$$SR_2/SR_1 \leq about\ 1.10 \tag{1}$$

Izod impact value×Flexural modulus/Haze value≧about 200  (2).

2. The propylene based resin composition according to claim 1, wherein the propylene block copolymer has a melt flow rate of not more than about 2 g/10 min. at a temperature of 230° C.

3. The propylene based resin composition according to claim 1, wherein the ethylene based resin comprises an ethylene-α-olefin copolymer obtained by polymerizing ethylene with an α-olefin in the presence of a metallocene catalyst.

4. The propylene based resin composition according to claim 1, wherein the ethylene based resin comprises an ultra low-density polyethylene.

5. The propylene based resin composition according to claim 1, wherein the ethylene based resin comprises a resin blend of:
   (i) an ethylene-α-olefin copolymer obtained by polymerizing ethylene with an α-olefin in the presence of a metallocene catalyst; and
   (ii) at least one ethylene based resin selected from the group consisting of an ultra low-density polyethylene, a low-density polyethylene and an ethylene-α-olefin copolymer different from the ethylene-α-olefin copolymer of paragraph (i).

6. The propylene based resin composition according to claim 5, wherein the low-density polyethylene is produced according to a high pressure radical polymerization.

7. The propylene based resin composition according to claim 1, wherein the composition further comprises a crystalline nucleating agent in an amount of from about 0.01 to 0.5 parts by weight based on 100 parts by weight of the composition.

8. A blow-molded container comprising a propylene based resin composition, which comprises:
   (i) about 70 to 90% by weight of a propylene block copolymer; and
   (ii) about 30 to 10% by weight of an ethylene based resin, wherein:
      (a) the relation between its die swelling ratio ($SR_1$) at a shear rate of 6.08 sec$^{-1}$ and its die swelling ratio ($SR_2$) at a shear rate of 608 sec$^{-1}$ satisfies the following formula (1); and
      (b) the relation among its Izod impact value (kJ/m$^2$) at a temperature of 0° C., its flexural modulus (MPa) at a temperature of 23° C. and its haze value (%) satisfies the following formula (2)

$$SR_2/SR_1 \leq about\ 1.10 \tag{1}$$

Izod impact value×Flexural modulus/Haze value≧about 200  (2).

9. The blow-molded container according to claim 8, wherein the container has an in-mold label on its surface.

10. A blow-molded multilayer container, which comprises at least one layer containing of a propylene based resin composition, which comprises:
   (i) about 70 to 90% by weight of a propylene block copolymer; and
   (ii) about 30 to 10% by weight of an ethylene based resin, wherein:
      (a) the relation between its die swelling ratio ($SR_1$) at a shear rate of 6.08 sec$^{-1}$ and its die swelling ratio ($SR_2$) at a shear rate of 608 sec$^{-1}$ satisfies the following formula (1); and
      (b) the relation among its Izod impact value (kJ/m$^2$) at a temperature of 0° C., its flexural modulus (MPa) at a temperature of 23 C. and its haze value (%) satisfies the following formula (2)

$$SR_2/SR_1 \leq about\ 1.10 \tag{1}$$

Izod impact value×Flexural modulus/Haze value≧about 200  (2).

* * * * *